United States Patent
Bogineni et al.

(10) Patent No.: US 11,647,422 B2
(45) Date of Patent: *May 9, 2023

(54) ADAPTABLE RADIO ACCESS NETWORK

(71) Applicant: Verizon Patent and Licensing Inc., Basking Ridge, NJ (US)

(72) Inventors: Kalyani Bogineni, Hillsborough, NJ (US); Ratul Kumar Guha, Kendall Park, NJ (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/389,751

(22) Filed: Jul. 30, 2021

(65) Prior Publication Data
US 2021/0360478 A1   Nov. 18, 2021

Related U.S. Application Data

(63) Continuation of application No. 16/597,005, filed on Oct. 9, 2019, now Pat. No. 11,089,515, which is a
(Continued)

(51) Int. Cl.
*H04W 28/16* (2009.01)
*H04W 12/06* (2021.01)
*H04W 76/10* (2018.01)

(52) U.S. Cl.
CPC .......... *H04W 28/16* (2013.01); *H04W 12/06* (2013.01); *H04W 76/10* (2018.02)

(58) Field of Classification Search
CPC ...... H04W 12/06; H04W 28/16; H04W 76/10
See application file for complete search history.

(56) References Cited

U.S. PATENT DOCUMENTS

| 9,111,288 B2 | 8/2015 | Paul et al. |
| 10,708,368 B1 | 7/2020 | Young et al. |

(Continued)

OTHER PUBLICATIONS

"3rd Generation Partnership Project; Technical Specification Group Radio Access Network; NR; NR and NG-RAN Overall Description; Stage 2 (Release 15)", 3GPP, https://portal.3gpp.org/desktopmodules/Specifications/SpecificationDetails.aspx?specificationId=3191, Apr. 2, 2018, 71 pages.

(Continued)

*Primary Examiner* — Melanie Jagannathan

(57) ABSTRACT

A device can receive, at a radio access network (RAN) and from a user device, first information to initiate a communications session that has one or more properties. The device can send second information to an access and mobility management function component (AMF) to authenticate the user device. The device can send third information to a user plane function component (UPF) to determine a set of network slice policies for managing the communications session. The device can receive the set of network slice policies and apply the set of network slice policies to the communications session. The device can detect a change in the one or more properties of the communications session and send a signal to the UPF to analyze the communications session. The device can receive a new set of network slice policies and apply the new set of network slice policies to the communications session.

20 Claims, 7 Drawing Sheets

Related U.S. Application Data continuation of application No. 15/987,556, filed on May 23, 2018, now Pat. No. 10,484,911.

(56) References Cited

U.S. PATENT DOCUMENTS

| | | |
|---|---|---|
| 10,892,957 B2 | 1/2021 | Chou et al. |
| 2017/0289791 A1 | 10/2017 | Yoo et al. |
| 2017/0303259 A1 | 10/2017 | Lee et al. |
| 2017/0359768 A1 | 12/2017 | Byun et al. |
| 2018/0014222 A1 | 1/2018 | Song et al. |
| 2018/0054765 A1 | 2/2018 | Kim et al. |
| 2018/0123961 A1 | 5/2018 | Farmanbar et al. |
| 2018/0191563 A1 | 7/2018 | Farmanbar et al. |
| 2018/0192390 A1 | 7/2018 | Li et al. |
| 2018/0227872 A1 | 8/2018 | Li et al. |
| 2018/0262924 A1 | 9/2018 | Dao et al. |
| 2018/0270743 A1 | 9/2018 | Callard et al. |
| 2018/0270820 A1 | 9/2018 | Gupta et al. |
| 2018/0288582 A1 | 10/2018 | Buckley et al. |
| 2018/0317157 A1 | 11/2018 | Baek et al. |
| 2018/0359337 A1 | 12/2018 | Kodaypak et al. |
| 2018/0359795 A1 | 12/2018 | Baek et al. |
| 2018/0376384 A1 | 12/2018 | Youn et al. |
| 2019/0053104 A1 | 2/2019 | Qiao et al. |
| 2019/0053147 A1* | 2/2019 | Qiao ................ H04M 15/8038 |
| 2019/0053308 A1 | 2/2019 | Castellanos et al. |
| 2019/0182875 A1 | 6/2019 | Talebi Fard et al. |
| 2019/0230556 A1 | 7/2019 | Lee |
| 2019/0289475 A1* | 9/2019 | Hedman ............... H04W 24/02 |
| 2019/0306251 A1* | 10/2019 | Talebi Fard .......... H04W 76/10 |
| 2019/0357130 A1 | 11/2019 | Garcia Azorero et al. |
| 2019/0357131 A1 | 11/2019 | Sivavakeesar et al. |
| 2020/0008139 A1 | 1/2020 | Lai et al. |
| 2020/0053636 A1 | 2/2020 | Mas Rosique et al. |
| 2020/0053828 A1 | 2/2020 | Bharatia et al. |
| 2020/0084107 A1 | 3/2020 | Li |
| 2020/0107213 A1 | 4/2020 | Park et al. |
| 2020/0113001 A1 | 4/2020 | Shimojou et al. |
| 2020/0154292 A1* | 5/2020 | Bor-Yaliniz .......... H04W 28/08 |
| 2020/0187106 A1 | 6/2020 | Salkintzis et al. |
| 2020/0260371 A1 | 8/2020 | Wang |
| 2020/0305174 A1 | 9/2020 | Ganesan et al. |
| 2021/0014778 A1 | 1/2021 | Xi |
| 2021/0282072 A1* | 9/2021 | Xin ....................... H04W 28/16 |
| 2022/0021590 A1* | 1/2022 | Seetharaman ...... H04L 41/5006 |

OTHER PUBLICATIONS

"3rd Generation Partnership Project; Technical Specification Group Services and System Aspects; System Architecture for the 5G System; Stage 2 (Release 15)", 3GPP, https://portal.3gpp.org/desktopmodules/Specifications/SpecificationDetails.aspx?specificationId=3144, Mar. 28, 2018, 201 pages.

"Mobile edge computing", Wikipedia, https://en.wikipedia.org/wiki/Mobile_edge_computing, Jun. 21, 2017, 3 pages.

"Mobile Edge Computing (MEC); Framework and Reference Architecture", ETSI, http://www.etsi.org/deliver/etsi_gs/MEC/001_099/003/01.01.01_60/gs_MEC003v010101p.pdf, Feb. 14, 2018, 18 pages.

Giust, et al., "MEC Deployments in 4G and Evolution Towards 5G", http://www.etsi.org/images/files/ETSIWhitePapers/etsi_wp24_MEC_deployment_in_4G_5G_FINAL.pdf, Feb. 22, 2018, 24 pages.

Reznik, et al., "Cloud RAN and MEC: A Perfect Pairing", http://www.etsi.org/images/files/ETSIWhitePapers/etsi_wp23_MEC_and_CRAN_ed1_FINAL.pdf, Feb. 22, 2018, 24 pages.

Reznik, et al., "Developing Software for Multi-Access Edge Computing", http://www.etsi.org/images/files/ETSIWhitePapers/etsi_wp20_MEC_SoftwareDevelopment_FINAL.pdf, Sep. 23, 2017, 16 pages.

\* cited by examiner

ADAPTABLE RADIO ACCESS NETWORK

RELATED APPLICATION

This is a continuation of U.S. patent application Ser. No. 16/597,005, filed Oct. 9, 2019, which is a continuation of U.S. patent application Ser. No. 15/987,556, filed May 23, 2018, now U.S. Pat. No. 10,484,911, issued Nov. 19, 2019, the contents of each of which are herein incorporated by reference in their entirety.

BACKGROUND

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, high-frequency communication (e.g., millimeter wave (mm Wave)), and/or the like.

DETAILED DESCRIPTION OF PREFERRED EMBODIMENTS

The following detailed description of example implementations refers to the accompanying drawings. The same reference numbers in different drawings can identify the same or similar elements.

In a wireless telecommunications system, such as a 5G wireless telecommunications network, a radio access network (RAN) includes a base station and manages radio access resources to facilitate a communications session between a user device and a core network associated with the wireless telecommunications system. In some instances, the RAN can define and apply a set of policies to the communications session to try to provide an optimal allocation of the radio access resources to support the communications session. However, the RAN must statically define and apply the set of policies at the beginning of a communications session, which can result in an inefficient or ill-suited use of the radio access resources to support the communications session. Moreover, if a RAN operator wants to modify the set of policies, the RAN operator has to make the changes offline (i.e., after the communications session has ended and/or before another communications session is initiated) by incorporating the changes into a new software release and installing the new software release on the RAN.

Some implementations, described herein, provide a RAN capable of monitoring a communications session and dynamically updating the set of policies to apply to the communications session. In some implementations, the RAN can detect a change in the communications session, notify a component associated with the core network about the change, receive a new set of policies, and apply the new set of policies to the communications session. In this way, the RAN can be adaptable and make run-time changes to the set of policies during a communications session (e.g., at the start of the communications session, mid-session of the communications session, any time within the communications session, and/or the like) as opposed to making changes to the set of policies in a software update to the RAN between communications sessions or during network maintenance.

In some implementations, the new set of policies can define a more efficient allocation of radio access resources to apply to a communications session so as to also be able to support a high load of communications sessions (e.g., hotspot coverage in a dense area). In some implementations, the new set of policies can define a more robust allocation of radio access resources to apply to the communications session to support a high priority communications session (e.g., an emergency services communication). In this way, the RAN can apply sets of policies to the communications session tailored to the specific needs of the RAN and/or the communications session, which can result in lower network latency, increased network reliability, increased quality of service, more efficient uses of radio access resources, and/or the like.

Figure 1A:
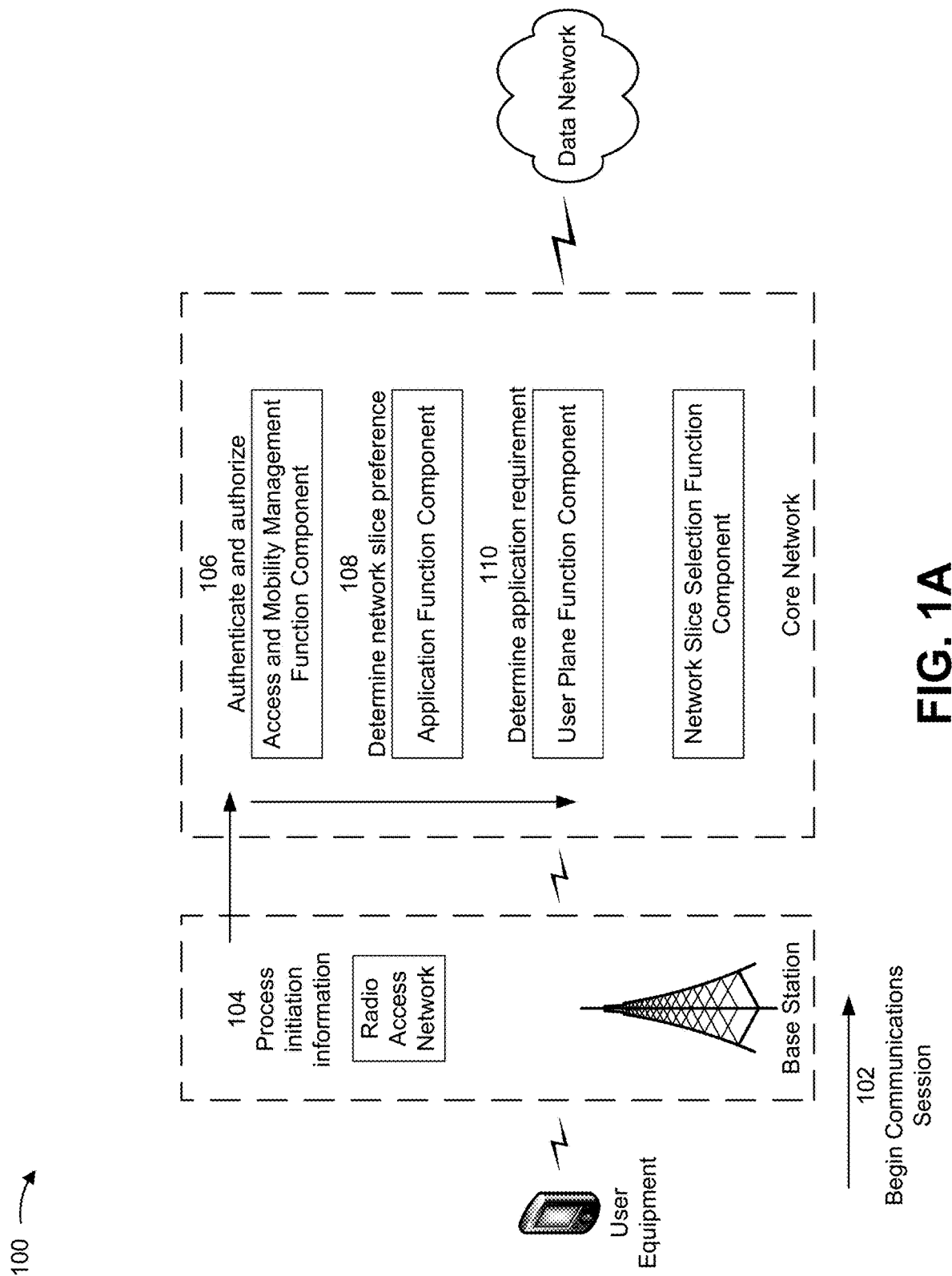
FIGS. 1A-1C are diagrams of an example implementation described herein.
Figure 1B:
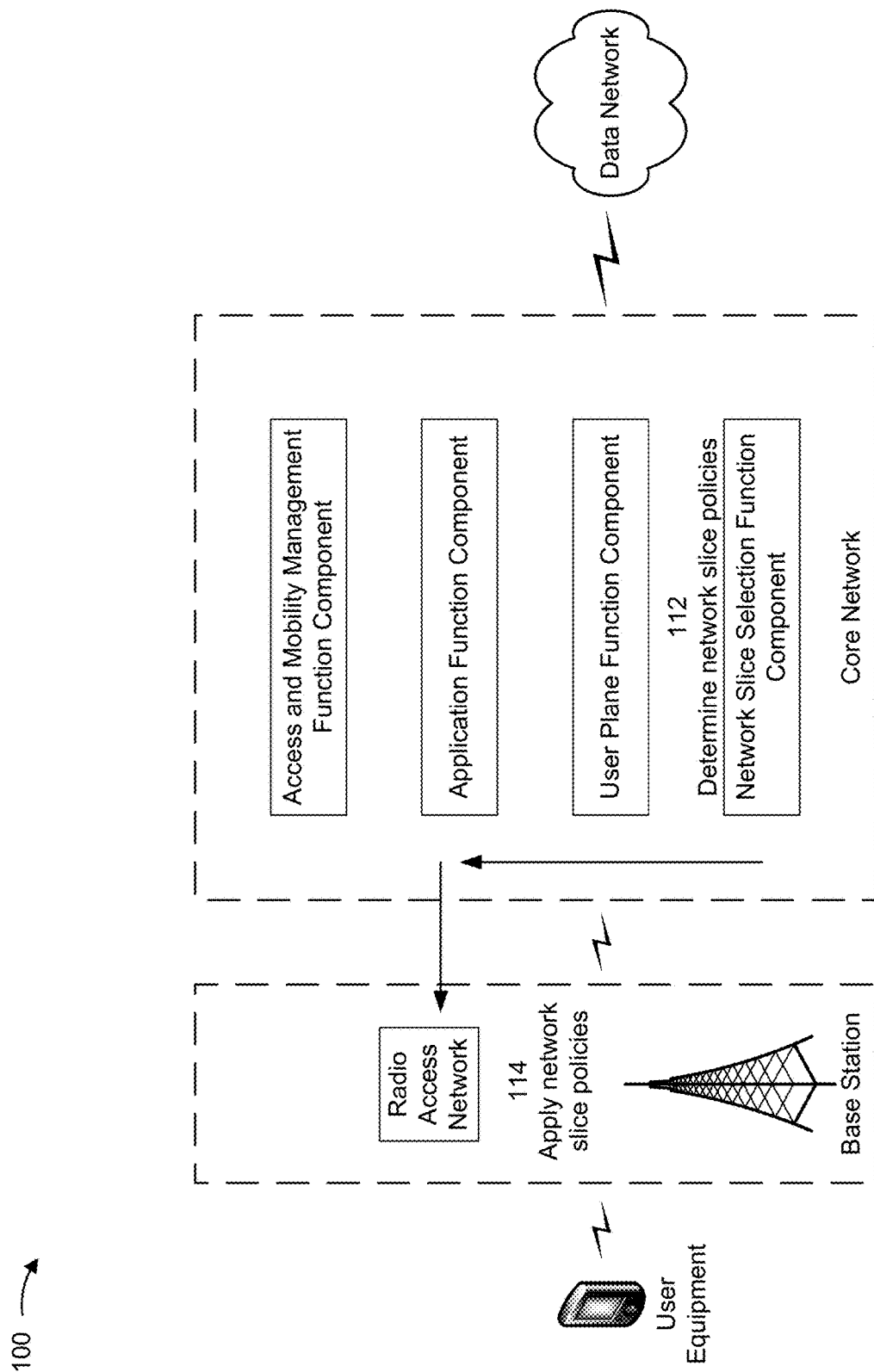
Figure 1C:
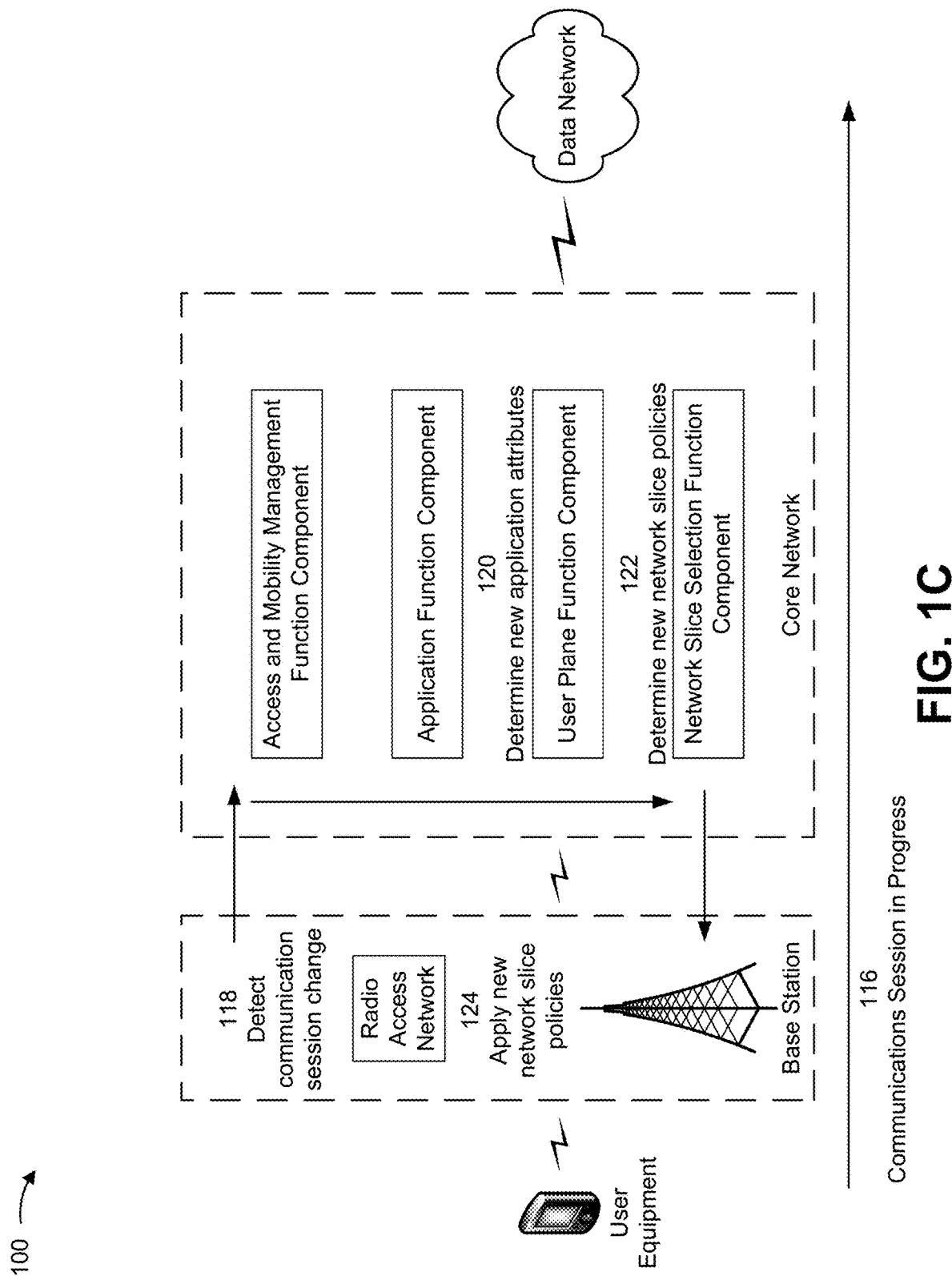

FIGS. 1A-1C are diagrams of an example implementation 100 described herein. Example implementation 100 illustrates various portions of a wireless telecommunications system, which in some implementations can be a 5G wireless telecommunications system. Example implementation 100 can be a 5G wireless telecommunications system, a 4G wireless telecommunications system, a long term evolution (LTE) wireless telecommunications system, a LTE-Advanced (LTE-A) wireless telecommunications system, and/or the like.

As shown in FIGS. 1A-1C, example implementation 100 can include a user equipment (UE) wirelessly connected to a radio access network (RAN) at a base station, which is connected to a data network via a core network. The UE can run an application that requires communicating with the data network and, therefore, the UE can enter into a communications session with the data network via the RAN and core network. The UE and the core network can communicate application-specific data during the communications session.

The UE of example implementation 100 can be a communication and/or computing device, such as a mobile phone, a smartphone, a laptop computer, a tablet computer, an Internet of Things device, and/or the like. In some implementations, the UE can include one or more processes that, when executed by one or more processors of the user device, facilitates the communications session with the data network.

The base station of example implementation 100 can include an access point of a RAN, such as a 5G next generation NodeB (gNodeB or gNB), a LTE evolved NodeB (eNodeB or eNB), and/or the like. In some implementations, the base station facilitates the communications session by communicating the application-specific data between the LE and the core network.

The core network of example implementation 100 can include various types of telecommunications core networks, such as a 5G next generation core network (NG Core), a LTE evolved packet core (EPC), and/or the like. In some implementations, the core network can include an access and mobility management function (AMF) component, an application function (AF) component, a user plane function (UPF) component, a network slice selection function (NSSF) component, as well as other components and functions. In some implementations, the AMF component, the AF component, the UPF component, the NSSF component, as well as the other components and functions, may not be collocated (e.g., each component and/or function of the core network may be at a different location from each other component and/or function of the core network).

The AMF component of example implementation 100 can provide authentication and authorization of the UE. In some implementations, an authentication server function (AUSF) component assists the AMF component in authenticating and authorizing the UE. The AF component can determine whether the UE provides a preference for a set of network slice policies, which can define how radio access resources can be allocated at the RAN. The UPF component can determine an attribute of the application-specific data that is communicated in the communications session. Based on the determinations of the AF component and the UPF component, the NSSF component can determine the set of network slice policies to be applied at the RAN to facilitate communication of the application-specific data in the communications session.

The set of network policies can set rules and/or requirements at a network level (e.g., for all or a subset of UEs, for all or specific applications, for all or specific geographic areas, and/or the like) and/or a user level (e.g., per UE, per application, and/or the like). The set of network slice policies can include an area capacity policy (e.g., a data rate capacity over an area), a mobility policy (e.g., location and speeds of UEs), a density policy (e.g., a number of communications sessions over an area), a guaranteed minimum data rate policy (e.g., minimum download and upload speeds), a maximum bitrate policy (e.g., maximum download and upload bitrates), a relative priority policy (e.g., relative importance of the application and/or UE compared to other applications and/or UEs), an absolute priority policy (e.g., objective importance of the application and/or UE compared to other applications and/or UEs), a latency rate policy (e.g., an end-to-end communications transmission time), and/or a reliability policy (e.g., a communications transmission success rate). In some implementations, the set of network slice policies can define a low latency performance requirement (e.g., an end-to-end communications transmission time less than or equal to a threshold, such as 10 ms), a high latency performance requirement (e.g., an end-to-end communications transmission time greater than a threshold, such as 10 ms), a low reliability performance requirement (e.g., a communications transmission success rate less than a threshold, such as 99.99%), a high reliability performance requirement (e.g., a communications transmission success rate greater than or equal to a threshold, such as 99.99%), a high data rate performance requirement (e.g., download and upload speeds above a threshold, such as 50 Mbps), a low data rate performance requirement (e.g., download and upload speeds less than or equal to a threshold, such as 50 Mbps), a high traffic density requirement (e.g., greater than or equal to a threshold number of user devices per geographical area, such as 10,000 user devices per square kilometer), and/or a low traffic density requirement (e.g., less than a threshold number of user devices per geographical area, such as 10,000 user devices per square kilometer).

In some implementations, the set of network slice policies can define a category for the communications session, such as an enhanced mobile broadband category (e.g., for providing enhanced broadband access in dense areas, ultra-high bandwidth access in dense areas, broadband access in public transport systems, and/or the like), a connected vehicles category (e.g., for providing vehicle-to-everything (V2X) communications, such as vehicle-to-vehicle (V2V) communications, vehicle-to-infrastructure (V2I) communications, vehicle-to-network (V2N) communications, and vehicle-to-pedestrian (V2P) communications, and/or the like), a real-time service category (e.g., for providing inter-enterprise communications, intra-enterprise communications, maps for navigation, and/or the like), an enhanced multi-media category (e.g., for providing broadcast services, on demand and live TV, mobile TV, augmented reality (AR), virtual reality (VR), and/or the like), an internet of things category (e.g., for providing metering, lighting management in buildings and cities, environmental monitoring, traffic control, and/or the like), an ultra-reliable low latency applications category (e.g., for providing process automation, automated factories, tactile interaction, emergency communications, urgent healthcare, and/or the like), and/or a fixed wireless access category (e.g., for providing localized network access and/or the like).

The data network of example implementation 100 can include various types of data networks, such as the Internet, a third party services network, an operator services network, a private network, a wide area network, and/or the like.

As shown in FIG. 1A, and by reference number 102, the UE can send a request (e.g., first information) to the base station of the RAN to initiate a communications session between the UE and the data network. For example, the UE can run an application that instructs the UE to communicate with an application server that is communicatively connected to the data network.

In some implementations, the communications session can have one or more properties, such as a type of application associated with the communications session, a type of service associated with the communications session, a source internet protocol (IP) address associated with the communications session, a destination IP address associated with the communications session, a source port associated with the communications session, a destination port associated with the communications session, a protocol associated with the communications session, a packet characteristic associated with the communications session, and/or a type of application programming interface (API) associated with the communications session.

In some implementations, the request can include information that identifies the UE (e.g., second information), such as information concerning a type of the UE, an operating system running on the UE, hardware components of the UE, the UE's wireless network provider, the UE's wireless network plan, the UE's preferred allocation of radio access resources at the RAN (e.g., a preference concerning the set of network slice policies to apply to the communications session) and/or the like. Additionally, or alternatively, the request can include information that identifies a communications attribute of the application (e.g., third information), such as information concerning a name of the application, a type of the application, and/or the like.

As further shown in FIG. 1A, and by reference number 104, the base station can receive the request (e.g., the first information) and process the request to determine the information that identifies the UE (e.g., the second information) and the information that identifies a communications attribute of the application (e.g., the third information). In some implementations, the base station separately sends the information that identifies the UE and the information that identifies a communications attribute of the application from the request. In some implementations, the base station can parse the request to determine the information that identifies the UE and the information that identifies the communications attribute of the application. In some implementations, the base station can parse the request using natural language processing to determine the information that identifies the UE and the information that identifies the communications attribute of the application. In some implementations, the base station can detect the format of the request (e.g., JavaScript Object Notation (JSON), Hypertext Markup Language (HTML), YAML Ain't Markup Language (YAML), Extensible Markup Language (XML), and/or the like), and determine, based on the detected format, the information that identifies the UE and the information that identifies the communications attribute of the application. In some implementations, the base station can utilize a machine learning or artificial intelligence model to determine the information that identifies the UE and the information that identifies the communications attribute of the application.

As further shown in FIG. 1A, and by reference number 106, the base station can send the information that identifies the UE to the AMF component at the core network to authenticate and authorize the UE. In some implementations, the AMF component can determine whether the UE is a valid device capable of communicating over the wireless network and whether the UE has permission to connect with the wireless network. In some implementations, the AMF component can utilize a lookup table to determine whether to authenticate and authorize the UE. For example, the AMF component can compare the information that identifies the UE with information accessible to the AMF component that identifies devices that are authorized to connect with the wireless network (e.g., devices that subscribe to a wireless network provider that maintains the wireless network, devices that are capable of communicating with a type of the wireless network, and/or the like). In some implementations, the AMF component can generate a UE approval signal indicating that the UE is authenticated and authorized (e.g., a first signal) and send the UE approval signal to the base station. In this case, the base station can receive the UE approval signal from the AMF component to continue initiating the communications session between the UE and the data network, via the RAN and the core network.

As further shown in FIG. 1A, and by reference number 108, the AMF component can send some or all of the information that identifies the UE to the AF component, which can determine whether the UE prefers a set of network slice policies for managing the communications session at the RAN. In some implementations, the AF component can parse, in a manner similar to that described herein, the some or all of the information that identifies the UE to determine a UE preference concerning a set of network slice policies for managing the communications session at the RAN. For example, the AF component, based on the information that identifies the UE that indicates that the UE is subscribed to a low data rate wireless network plan, can determine that the UE preference is a low data rate set of network slice policies for managing the communications session at the RAN. In some implementations, the AF component can send first data indicating the UE preference to the NSSF component to determine the set of network slice policies for managing the communications session. In some implementations, the AF can determine that no UE preference exists. In that case, the AF does not send data indicating a UE preference to the NSSF component.

As further shown in FIG. 1A, and by reference number 110, the base station can send the information that identifies the communications attribute of the application (e.g., the third information) to the UPF component at the core network to determine the set of network slice policies for managing the communications session at the RAN. In some implementations, the UPF component can parse, in a manner similar to that described herein, the information that identifies the communications attribute of the application to determine a communications requirement of the application. For example, the UPF component, based on the information that identifies the communications attribute of the application that indicates that the application type is mobile video, can determine that the application has a high data rate communications requirement. In some implementations, the UPF component can send second data indicating the communications requirement of the application to the NSSF component to determine the set of network slice policies for managing the communications session.

As shown in FIG. 1B, and by reference number 112, the NSSF component can process the first data indicating the UE preference and/or the second data indicating the communications requirement to determine the set of network slice policies for managing the communications session. In some implementations, the NSSF component can send the network slice policies to the UPF component, which can send the network slice policies to the base station. In this case, the base station can receive the set of network slice policies from the UPF component. In some implementations, the NSSF component can send the network slice policies to a control plane of the UPF component, and the UPF component can send the network slice policies to a control plane of the base station. In some implementations, the NSSF can send the network slice policies to the UPF via an in-band mechanism (e.g., a differentiated services code point (DSCP) and/or the like), which can send the network slice policies to the base station via the in-band mechanism (e.g., the differentiated services code point (DSCP) and/or the like).

In some implementations, where the UPF component did not send first data indicating the UE preference, the NSSF can determine the set of network slice policies based on the second data indicating the communications requirement. The NSSF component can process the second data indicating the communications requirement by using a lookup table, in a similar manner as described herein, to determine the set of network slice policies. For example, where the second data indicates a high data rate communications requirement, the NSSF component can use a lookup table to find high data rate sets of network slice policies. The NSSF component can then select the set of network slice policies from the high data rate sets of network slice policies.

In some implementations, where the UPF component sent the first data indicating the UE preference, the NSSF component can determine the set of network slice policies based on the first data indicating the UE preference. The NSSF component can process the first data indicating the UE preference by using a lookup table, in a similar manner as described herein, to determine the set of network slice policies. In some implementations, where the first data indicating the UE preference was sent by the UPF component, the NSSF component can compare the first data indicating the UE preference and the second data indicating the communications requirement, and based on the comparison, use a lookup table, in a similar manner as described herein, to determine the set of network slice policies.

In some implementations, the NSSF component can utilize a machine learning or artificial intelligence model to determine the set of network slice policies. For example, based on the model, the NSSF component can weight the first data indicating the UE preference and the second data indicating the communications requirement, as well as other factors, such as the allocation of the radio access resources at the base station, a quantity of communications sessions communicating through the base station and core network (e.g., potentially hundreds, thousands, millions, etc. of concurrent communications sessions), a quantity of communications sessions communicating between the UE and the data network (e.g., a UE can run multiple applications that each require one or more communications sessions), and/or the like, to determine the set of network slice policies.

In some implementations, the NSSF component can train the model based on an artificial intelligence approach, such as a machine learning algorithm, a neural network algorithm, or another type of artificial intelligence approach. To train the model based on the artificial intelligence approach, the NSSF component can use a training set of known inputs (e.g., the first data indicating UE preferences and the second data indicating communications requirements) and known outputs corresponding to the inputs (e.g., sets of network slice policies). For example, the NSSF component can train the model based on a training set of data that includes an input group (e.g., past inputs relating to the first data indicating the UE preferences and the second data indicating the communications requirements) and an output group (e.g., past outputs relating to the sets of network slice policies), where each input group, such as the first data indicating the UE preferences and the second data indicating the communications requirements, corresponds to an optimal output group, such as an optimal set of network slice policies. In some implementations, another device can train the model and provide the model for use by the NSSF component.

In some implementations, the artificial intelligence approach can identify relationships between the known inputs and the known outputs, and can configure parameters corresponding to the relationships. For example, the model can process the training set of data and create general rules for determining a set of network slice policies based on the first data indicating the UE preferences and the second data indicating the communications requirements. In some implementations, the model can be used to assign scores to sets of network slice policies based on a likelihood that the sets of network slice policies would provide an optimal communications session experience for the UE and/or the base station.

In some implementations, the NSSF component can update the model based on the artificial intelligence approach. For example, the NSSF component can use a testing set of known inputs (e.g., inputs relating to the first data indicating UE preferences and the second data indicating communications requirements) and target outputs corresponding to the known outputs (e.g., outputs relating to the sets of network slice policies). The target outputs can be outputs that are known to be optimal. The NSSF component can input, to the model, the known inputs of the testing set, and the model can output observed outputs. The NSSF component can compare the target outputs and the observed outputs, and can reconfigure the parameters of the model based on the artificial intelligence algorithm. In this way, the NSSF component can improve accuracy of the model based on iteratively improving accuracy of parameters of the model.

In some implementations, the NSSF component can use the trained and tested model to select the set of network slice properties. For example, the NSSF component can identify the first data indicating the UE preference and the second data indicating the communications requirement and use the first data indicating the UE preference and the second data indicating the communications requirement as inputs to the model. The model can then output information identifying one or more sets of network slice policies, possibly with corresponding scores for the one or more network slice policies. In some implementations, the NSSF component can select one of the one or more network slice policies based on the scores.

In this way, the NSSF component can deliver an optimized process for determining the set of network slice policies in a manner that conserves computing resources (e.g., processor resources, memory resources, and/or the like), which would otherwise be wasted performing an inefficient and/or time consuming process.

As further shown in FIG. 1B, and by reference number 114, the base station can apply the set of network policies to the communications session. In some implementations, the base station can apply the set of network slice policies by allocating the radio access resources according to the policies of the set of network slice policies, the requirements of the set of network slice policies, and/or the categories of the set of network slice policies. For example, the base station can allocate resources related to a base station capacity, a base station number of connections, a base station scheduler, and/or the like. The allocation of the radio access resources can affect how the UE communicates with the data network, via the RAN and core network, during the communications session. In some implementations, the base station can apply the set of network policies to affect a flow of one or more packets transmitted during the communications session.

As shown in FIG. 1C, and by reference number 116, the UE can communicate with the data network via the RAN and the core network in the communications session. In some implementations, one or more properties of the communications session can change. For example, changes can occur to the type of application associated with the communications session, the type of service associated with the communications session, the source internet protocol IP address associated with the communications session, the destination IP address associated with the communications session, the source port associated with the communications session, the destination port associated with the communications session, the protocol associated with the communications session, the packet characteristic associated with the communications session, and/or the type of API associated with the communications session.

As further shown in FIG. 1C, and by reference number 118, the base station can detect the change in the one or more properties of the communications session. For example, if the UE, which had been communicating with the application server during the communications session, begins to communicate with a different application server during the communications session, the base station can detect the change in the destination IP address of the communications session. In some implementations, the base station can generate a change signal that indicates the base station has detected a change in the one or more properties (e.g., second signal) of the communications session. In some implementations, the base station can send the change signal to the UPF component to analyze the communications session.

As further shown in FIG. 1C, and by reference number 120, the UPF component, based on receiving the change signal, can analyze the communications session to determine whether a new set of network slice policies is warranted. In some implementations, the UPF component can analyze the communications session by logging changes to the one or more properties of the communications session over a period of time. In some implementations, the UPF can generate an analysis signal that indicates which of the one or more properties of the communications sessions has changed over the period of time. In this case, the UPF component can send the analysis signal to the NSSF component to determine a new set of network slice policies for managing the communications session. In some implementations, the new set of network slice policies can define policies, categories, requirements, and/or the like in a similar manner as the set of network policies.

As further shown in FIG. 1C, and by reference number 122, the NSSF component can process the analysis signal to determine, in a similar manner to that described herein in relation to FIG. 1B, the new set of network slice policies for managing the communications session. For example, the NSSF component can utilize a machine learning or artificial intelligence model to determine the set of network slice policies based on the analysis signal. In some implementations, the NSSF component can send the new set of network slice policies to the UPF component, which can send the new set of network slice polices to the base station in a similar manner to that described herein in relation to FIG. 1B.

As further shown in FIG. 1C, and by reference number 124, the base station, in a similar manner to that described herein in relation to FIG. 1B, can apply the new network slice policies to the communications session. In some implementations, the new network slice policies can be applied to the communications during the communications session (e.g., at the start of the communications session, mid-session of the communications session, any time within the communications session, and/or the like) without interrupting the communications session.

In this way, some implementations described herein can provide tailored, better networking experience for UEs. Furthermore, some implementations described herein allow for run-time changes to radio access resources, thereby optimizing the use of the radio access resources in real-time. Additionally, some implementations described herein reduce the need for multiple RANs because one RAN is adaptable and able to handle multiple types of network connections.

As indicated above, FIGS. 1A-1C is provided merely as an example. Other examples are possible and can differ from what was described with regard to FIGS. 1A-1C.

Figure 2:
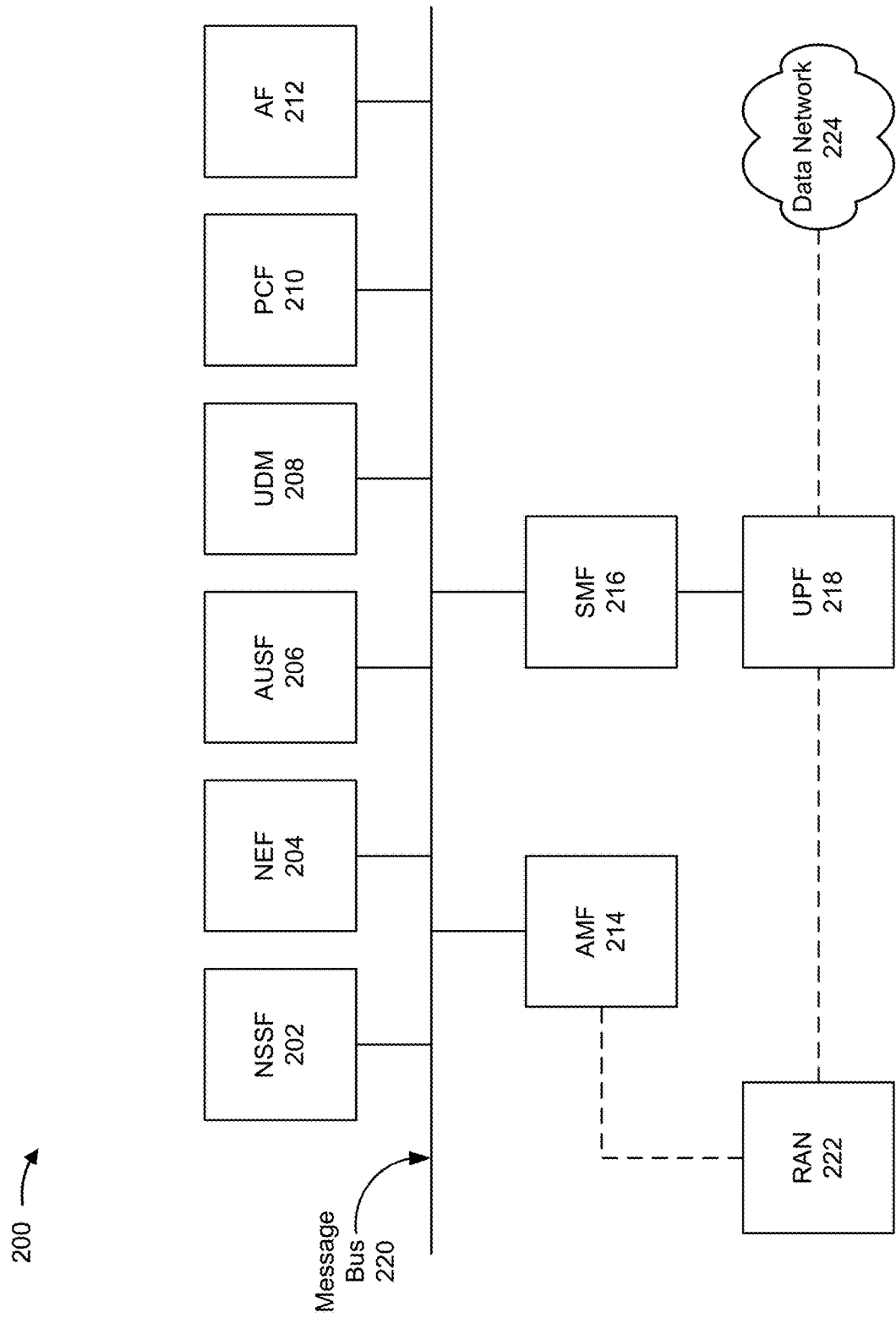
FIG. 2 is a diagram of an example functional architecture of an example core network described herein.

FIG. 2 is a diagram of an example functional architecture of a core network 200 in which systems and/or methods, described herein, can be implemented. For example, FIG. 2 can show an example functional architecture of a 5G NG core network included in a 5G wireless telecommunications system. In some implementations, the example functional architecture can be implemented by a core network (e.g., a core network described with respect to FIG. 3) and/or one or more of devices (e.g., a device described with respect to FIG. 4). While the example functional architecture of core network 200 shown in FIG. 2 can be an example of a service-based architecture, in some implementations, core network 200 can be implemented as a reference-point architecture.

As shown in FIG. 2, core network 200 can include a number of functional elements. The functional elements can include, for example, a NSSF 202, a Network Exposure Function (NEF) 204, an AUSF 206, a Unified Data Management (UDM) component 208, a Policy Control Function (PCF) 210, an AF 212, an AMF 214, a Session Management Function (SMF) 216, and a UPF 218. These functional elements can be communicatively connected via a message bus 220, which can be comprised of one or more physical communication channels and/or one or more virtual communication channels. Each of the functional elements shown in FIG. 2 is implemented on one or more devices associated with a wireless telecommunications system. In some implementations, one or more of the functional elements can be implemented on physical devices, such as an access point, a base station, a gateway, a server, and/or the like. In some implementations, one or more of the functional elements can be implemented on one or more computing devices of a cloud computing environment associated with the wireless telecommunications system. In some implementations, the core network 200 can be operatively connected to a RAN 222, a data network 224, and/or the like, via wired and/or wireless connections with UPF 218.

NSSF 202 can select network slice instances for UE's, where NSSF 202 can determine a set of network slice policies to be applied at the RAN 222. By providing network slicing, NSSF 202 allows an operator to deploy multiple substantially independent end-to-end networks potentially with the same infrastructure. In some implementations, each slice can be customized for different services. NEF 204 can support the exposure of capabilities and/or events in the wireless telecommunications system to help other entities in the wireless telecommunications system discover network services and/or utilize network resources efficiently.

AUSF 206 can act as an authentication server and support the process of authenticating UEs in the wireless telecommunications system. UDM 208 can store subscriber data and profiles in the wireless telecommunications system. UDM 208 can be used for fixed access, mobile access, and/or the like, in core network 200. PCF 210 can provide a policy framework that incorporates network slicing, roaming, packet processing, mobility management, and/or the like.

AF 212 can determine whether UEs provide preferences for a set of network slice policies and support application influence on traffic routing, access to NEF 204, policy control, and/or the like. AMF 214 can provide authentication and authorization of UEs. SMF 216 can support the establishment, modification, and release of communications sessions in the wireless telecommunications system. For example, SMF 216 can configure traffic steering policies at UPF 218, enforce UE IP address allocation and policies, and/or the like. AMF 214 and SMF 216 can act as a termination point for Non Access Stratum (NAS) signaling, mobility management, and/or the like. SMF 216 can act as a termination point for session management related to NAS. RAN 222 can send information (e.g. the information that identifies the UE) to AMF 214 and/or SMF 216 via PCF 210.

UPF 218 can serve as an anchor point for intra/inter Radio Access Technology (RAT) mobility. UPF 218 can apply rules to packets, such as rules pertaining to packet routing, traffic reporting, handling user plane QoS, and/or the like. UPF 218 can determine an attribute of application-specific data that is communicated in a communications session. UPF 218 can receive information (e.g., the information that identifies the communications attribute of the application) from RAN 222 via SMF 216 or an API. Message bus 220 represents a communication structure for communication among the functional elements. In other words, message bus 220 can permit communication between two or more functional elements. Message bus 220 can be a message bus, HTTP/2 proxy server, and/or the like.

RAN 222 can include a base station and be operatively connected, via a wired and/or wireless connection, to the core network 200 through UPF 218. RAN 222 can facilitate communications sessions between UEs and data network 224 by communicating application-specific data between RAN 222 and core network 200. Data network 224 can include various types of data networks, such as the Internet, a third party services network, an operator services network, a private network, a wide area network, and/or the like.

The number and arrangement of functional elements shown in FIG. 2 are provided as an example. In practice, there can be additional functional elements, fewer functional elements, different functional elements, or differently arranged functional elements than those shown in FIG. 2. Furthermore, two or more functional elements shown in FIG. 2 can be implemented within a single device, or a single functional element shown in FIG. 2 can be implemented as multiple, distributed devices. Additionally, or alternatively, a set of functional elements (e.g., one or more functional elements) of core network 200 can perform one or more functions described as being performed by another set of functional elements of core network 200.

Figure 3:
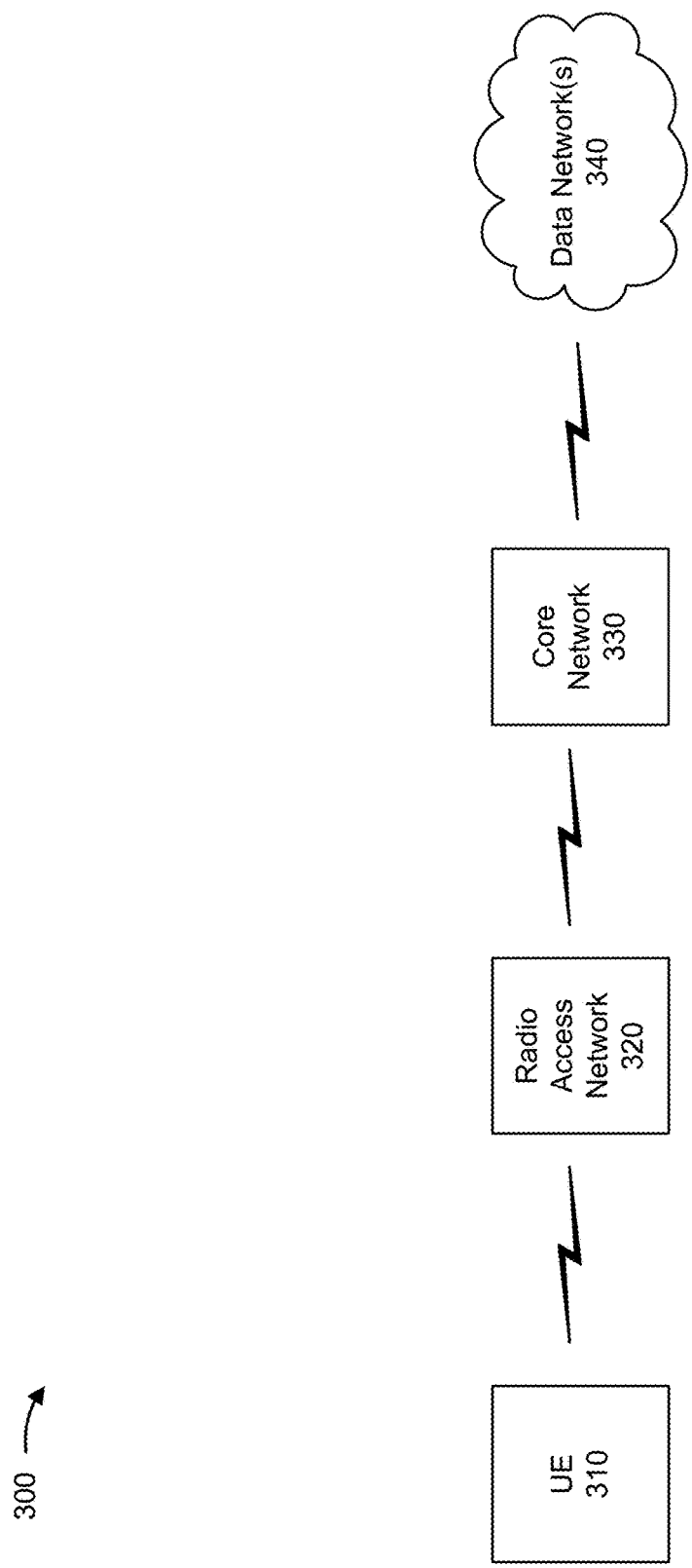
FIG. 3 is a diagram of an example environment in which systems, functional architectures, and/or methods, described herein, can be implemented.

FIG. 3 is a diagram of an example environment 300 in which systems and/or methods, described herein, can be implemented. As shown in FIG. 3, environment 300 can include a UE 310, a radio access network 320, a core network 330, and a data network 340. Devices of environment 300 can interconnect via wired connections, wireless connections, or a combination of wired and wireless connections.

UE 310 can include one or more devices capable of communicating with radio access network 320 and/or a data network 340 (e.g., via core network 330). For example, UE 310 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 310 can be capable of communicating using uplink (e.g., UE to radio access network) communications, downlink (e.g., radio access network to UE) communications, and/or sidelink (e.g., UE-to-UE) communications. In some implementations, UE 310 can include a machine-type communication (MTC) UE, such as an evolved or enhanced MTC (eMTC) UE. In some implementations, UE 310 can include an Internet of Things (IoT) UE, such as a narrowband IoT (NB-IoT) UE and/or the like.

Radio access network 320 can include one or more devices capable of communicating with UE 310 using a cellular RAT. For example, radio access network 320 can include a base station, a base transceiver station, a radio base station, a node B, an eNB, a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, a base station has the same characteristics and functionality of the radio access network 320, and vice versa. Radio access network 320 can transfer traffic between UE 310 (e.g., using a cellular RAT), radio access networks 320 (e.g., using a wireless interface or a backhaul interface, such as a wired backhaul interface), and/or core network 330. Radio access network 320 can provide one or more cells that cover geographic areas. Some radio access networks 320 can be mobile base stations. Some radio access networks 320 can be capable of communicating using multiple RATs.

In some implementations, radio access network 320 can perform scheduling and/or resource management for UEs 310 covered by radio access network 320 (e.g., UEs 310 covered by a cell provided by radio access network 320). In some implementations, radio access network 320 can be controlled or coordinated by a network controller, which can perform load balancing, network-level configuration, and/or the like. The network controller can communicate with radio access network 320 via a wireless or wireline backhaul. In some implementations, radio access network 320 can include a network controller, a self-organizing network (SON) module or component, or a similar module or component. In other words, radio access network 320 can perform network control, scheduling, and/or network management functions (e.g., for other radio access networks 320 and/or for uplink, downlink, and/or sidelink communications of UEs 310 covered by the radio access network 320). In some implementations, the radio access network 320 can apply network slice policies to perform the network control, scheduling, and/or network management functions. In some implementations, radio access network 320 can include a central unit and multiple distributed units. The central unit can coordinate access control and communication with regard to the multiple distributed units. The multiple distributed units can provide UEs 310 and/or other radio access networks 320 with access to data network 340 via core network 330.

Core network 330 can include various types of core network architectures, such as a 5G NG Core (e.g., core network 200 of FIG. 2), a LTE EPC, and/or the like. In some implementations, core network 330 can be implemented on physical devices, such as a gateway, a mobility management entity, and/or the like. In some implementations, the hardware and/or software implementing core network 330 can be virtualized (e.g., through the use of network function virtualization and/or software-defined networking), thereby allowing for the use of composable infrastructure when implementing core network 330. In this way, networking, storage, and compute resources can be allocated to implement the functions of core network 330 (described in FIG. 2) in a flexible manner as opposed to relying on dedicated hardware and software to implement these functions.

Data network 340 can include one or more wired and/or wireless data networks. For example, data network 340 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as an example. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
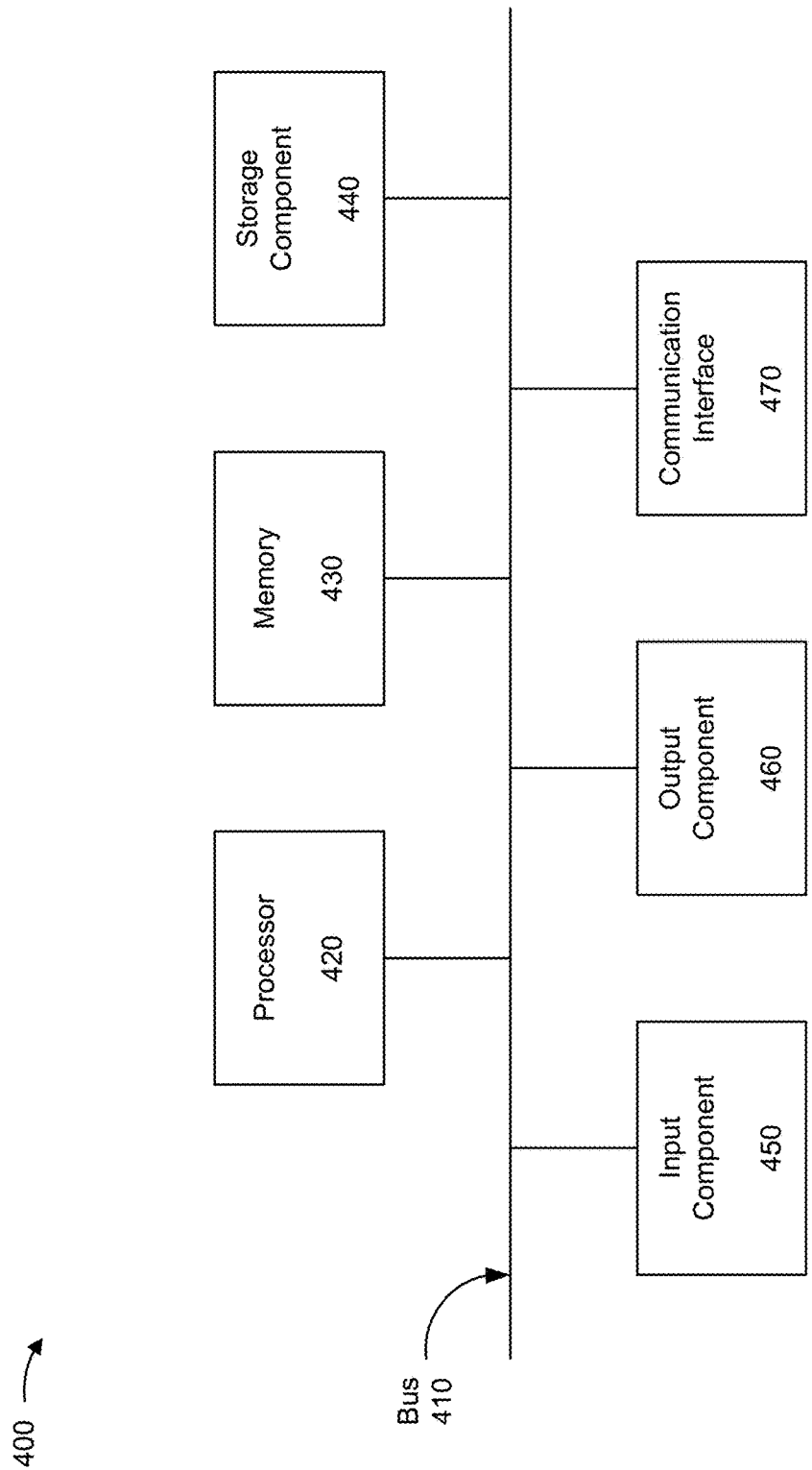
FIG. 4 is a diagram of example components of one or more devices of FIGS. 2 and 3.

FIG. 4 is a diagram of example components of a device 400. Device 400 can correspond to, or can implement, one or more functional elements of core network 200, UE 310, a base station of radio access network 320, one or more functional elements or devices of core network 330, and/or a device of data network 340. In some implementations, one or more functional elements of core network 200, UE 310, a base station of radio access network 320, one or more functional elements or devices of core network 330, and/or a device of data network 340 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
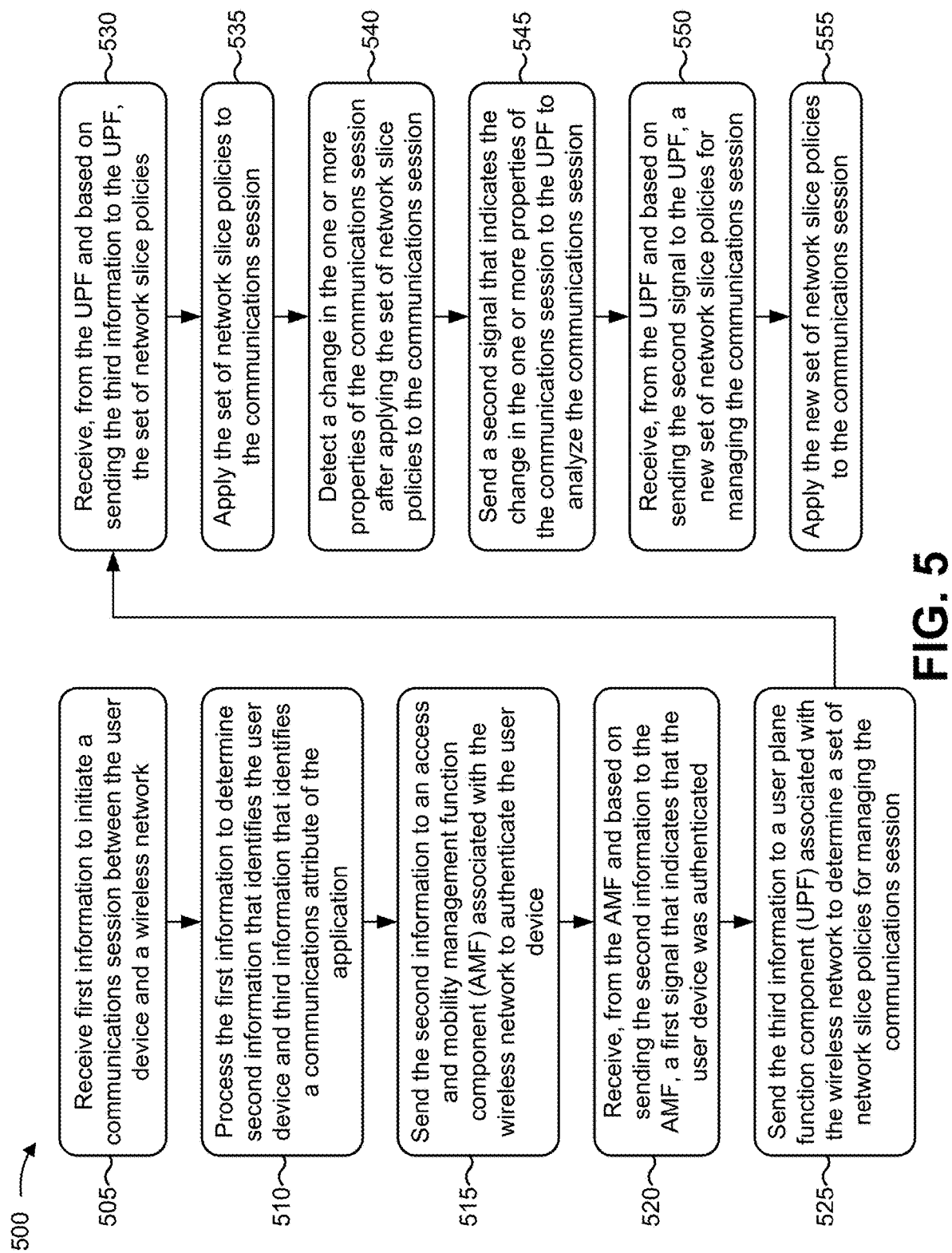
FIG. 5 is a flow chart of an example process for an adaptable radio access network.

FIG. 5 is a flow chart of an example process for an adaptable radio access network. In some implementations, one or more process blocks of FIG. 5 can be performed by a base station of a radio access network (e.g., radio access network 320). In some implementations, one or more process blocks of FIG. 5 can be performed by another device or a group of devices separate from or including the base station, such as other components in a core network (e.g., core network 200, core network 330, and/or the like), a user device (e.g., UE 310), and/or the like.

As shown in FIG. 5, process 500 can include receiving, from a user device running an application, first information to initiate a communications session between the user device and a wireless network (block 505). For example, the base station (e.g., using processor 420, memory 430, storage component 440, input component 450, communication interface 470, and/or the like) can receive, from a user device running an application, first information to initiate a communications session between the user device and a wireless network, in a manner that is the same as or similar to that described with regard to FIGS. 1A-1C. In some implementations, the communications session can have one or more properties.

As further shown in FIG. 5, process 500 can include processing the first information to determine second information that identifies the user device and third information that identifies a communications attribute of the application (block 510). For example, the base station (e.g., using processor 420, memory 430, storage component 440, and/or the like) can process the first information to determine second information that identifies the user device and third information that identifies a communications attribute of the application, in a manner that is the same as or similar to that described with regard to FIGS. 1A-1C.

As further shown in FIG. 5, process 500 can include sending the second information to an access and mobility management function component (AMF) associated with the wireless network to authenticate the user device (block 515). For example, the base station (e.g., using processor 420, memory 430, storage component 440, output component 460, communication interface 470, and/or the like) can send the second information to an access and mobility management function component (AMF) associated with the wireless network to authenticate the user device, in a manner that is the same as or similar to that described with regard to FIGS. 1A-1C.

As further shown in FIG. 5, process 500 can include receiving, from the AMF and based on sending the second information to the AMF, a first signal that indicates that the user device was authenticated (block 520). For example, the base station (e.g., using processor 420, memory 430, storage component 440, input component 450, communication interface 470, and/or the like) can receive, from the AMF and based on sending the second information to the AMF, a first signal that indicates that the user device was authenticated, in a manner that is the same as or similar to that described with regard to FIGS. 1A-1C.

As further shown in FIG. 5, process 500 can include sending, based on receiving the first signal, the third information to a user plane function component (UPF) associated with the wireless network to determine a set of network slice policies for managing the communications session (block 525). For example, the base station (e.g., using processor 420, memory 430, storage component 440, output component 460, communication interface 470, and/or the like) can send, based on receiving the first signal, the third information to a user plane function component (UPF) associated with the wireless network to determine a set of network slice policies for managing the communications session, in a manner that is the same as or similar to that described with regard to FIGS. 1A-1C.

As further shown in FIG. 5, process 500 can include receiving, from the UPF and based on sending the third information to the UPF, the set of network slice policies (block 530). For example, the base station (e.g., using processor 420, memory 430, storage component 440, input component 450, communication interface 470, and/or the like) can receive, from the UPF and based on sending the third information to the UPF, the set of network slice policies, in a manner that is the same as or similar to that described with regard to FIGS. 1A-1C.

As further shown in FIG. 5, process 500 can include applying the set of network slice policies to the communications session (block 535). For example, the base station (e.g., using processor 420, memory 430, storage component 440, and/or the like) can apply the set of network slice policies to the communications session, in a manner that is the same as or similar to that described with regard to FIGS. 1A-1C.

As further shown in FIG. 5, process 500 can include detecting a change in the one or more properties of the communications session after applying the set of network slice policies to the communications session (block 540). For example, the base station (e.g., using processor 420, memory 430, storage component 440, and/or the like) can detect a change in the one or more properties of the communications session after applying the set of network slice policies to the communications session, in a manner that is the same as or similar to that described with regard to FIGS. 1A-1C.

As further shown in FIG. 5, process 500 can include sending, based on detecting the change in the one or more properties of the communications session, a second signal that indicates the change in the one or more properties of the communications session to the UPF to analyze the communications session (block 545). For example, the base station (e.g., using processor 420, memory 430, storage component 440, output component 460, communication interface 470, and/or the like) can send, based on detecting the change in the one or more properties of the communications session, a second signal that indicates the change in the one or more properties of the communications session to the UPF to analyze the communications session, in a manner that is the same as or similar to that described with regard to FIGS. 1A-1C.

As further shown in FIG. 5, process 500 can include receiving, from the UPF and based on sending the second signal to the UPF, a new set of network slice policies for managing the communications session (block 550). For example, the base station (e.g., using processor 420, memory 430, storage component 440, input component 450, communication interface 470, and/or the like) can receive, from the UPF and based on sending the second signal to the UPF, a new set of network slice policies for managing the communications session, in a manner that is the same as or similar to that described with regard to FIGS. 1A-IC.

As further shown in FIG. 5, process 500 can include applying the new set of network slice policies to the communications session (block 555). For example, the base station (e.g., using processor 420, memory 430, storage component 440, and/or the like) can apply the new set of network slice policies to the communications session, in a manner that is the same as or similar to that described with regard to FIGS. 1A-1C.

Process 500 can include additional implementations, such as any single implementation or any combination of implementations described below and/or in connection with one or more other processes described elsewhere herein.

In some implementations, the radio access network, when receiving the set of network slice policies, can receive the set of network slice policies from a network slice selection function component (NSSF) via the UPF. In some implementations, the set of network slice policies includes at least one of: an area capacity policy, a mobility policy, a density policy, a data rate policy, a latency rate policy, or a reliability policy. In some implementations, the one or more properties of the communications session identify at least one of: a type of application associated with the communications session, a type of service associated with the communications session, a source internet protocol (IP) address associated with the communications session, a destination IP address associated with the communications session, a source port associated with the communications session, a destination port associated with the communications session, a protocol associated with the communications session, a packet characteristic associated with the communications session, or a type of application programming interface (API) associated with the communications session.

In some implementations, the second information includes a preference concerning the set of network slice policies to apply to the communications session. In some implementations, the new set of network slice policies defines at least one of: a low latency performance requirement, a high latency performance requirement, a low reliability performance requirement, a high reliability performance requirement, a high data rate performance requirement, a low data rate performance requirement, a high traffic density requirement, or a low traffic density requirement. In some implementations, the new set of network slice policies defines a category for the communications session, including at least one of: an enhanced mobile broad band category, a connected vehicles category, an enhanced multi-media category, an internet of things category, an ultra-reliable low latency applications category, or a fixed wireless access category.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Some implementations, described herein, provide a base station capable of monitoring a communications session and dynamically updating the set of network slice policies to apply to the communications session. In some implementations, the base station can detect a change in the communications session, notify a component associated with a core network about the change, receive a new set of network slice policies, and apply the new set of network slice policies to the communications sessions. In this way, the base station can be adaptable and make run-time updates to the set of policies during the communications session as opposed to making changes to the set of network slice policies during network maintenance.

In some implementations, the new set of network slice policies can define a more efficient allocation of radio access resources to apply to the communications session to support numerous communications sessions or a more robust allocation of radio access resources to apply to the communications session to support a high priority communications session. In this way, the base station can apply different sets of network slice policies, to the communications session, that are tailored to the specific needs of the base station and/or the communications session, which can result in lower network latency, increased network reliability, increased quality of service, more efficient use of radio access resources, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device in a radio access network (RAN) and from a user device running an application, a request to initiate a communications session using the RAN and a core network connected to the RAN, the request including request information;
providing, by the device in the RAN, a first portion of the request information to one or more devices in a core network associated with the RAN;
determining, by the one or more devices in the core network, a first set of one or more network slice policies for managing the communications session based on the first portion of the request information;
sending, by one of the one or more devices in the core network, the first set of one or more network slice policies to the device in the RAN;
applying, by the device in the RAN, the first set of the one or more network slice policies to the communications session;
detecting a change in one or more properties of the communications session after applying the set of network slice policies to the communications session;
determining, by the one or more devices in the core network, a second set of one or more network slice policies for managing the communications session based on the change;
sending, by one of the one or more devices in the core network, the second set of one or more network slice policies to the device in the RAN; and
applying, by the device in the RAN, the second set of one or more network slice policies to the communications session, the second set of one or more network slice policies being applied during the communication session and without communicating with the user device.

2. The method of claim 1, wherein the one or more devices of the core network include a Network Slice Selection Function (NSSF) component, an Access and Mobility Management Function (AMF) component and a User Plane Function (UPF) component.

3. The method of claim 1, wherein the first portion of the request information is one of:
   information that identifies the user device, or
   information that identifies a communications attribute of the application.

4. The method of claim 3, wherein the information that identifies the user device includes one or more of:
   information identifying a type of the user device,
   information identifying an operating system running on the user device,
   information identifying one or more hardware components of the user device,
   information identifying a wireless network provider of the user device,
   information identifying a wireless network plan of the user device, or
   information identifying a preferred allocation of radio access resources of the user device.

5. The method of claim 1, further comprising:
   providing, by the device in the RAN, a second portion of the request information to the one or more devices in the core network;
   wherein determining, by the one or more devices in the core network, the first set of one or more network slice policies for managing the communications session is based on both the first portion of the request information and the second portion of the request information.

6. The method of claim 5, wherein the first portion of the request information is information that identifies the user device, and the second portion of the request information is information that identifies a communications attribute of the application.

7. The method of claim 1, wherein determining, by the one or more devices in the core network, the first set of one or more network slice policies for managing the communications session based on the first portion of the request information includes:
   determining, by a Network Slice Selection Function (NSSF) component of the one or more devices in the core network, the first set of one or more network slice policies based on the first portion of the request information.

8. The method of claim 1, wherein providing, by the device in the RAN, the first portion of the request information to the one or more devices in the core network includes:
   providing the first portion of the request information to an Access and Mobility Function (AMF) component of the one or more devices in the core network; and
   providing, by the AMF component, the first information to an Application Function (AF) component of the one or more devices in the core network.

9. The method of claim 8, wherein determining, by the one or more devices in the core network, the first set of one or more network slice policies for managing the communications session based on the first portion of the request information includes:
   determining, by the AF component, user device preferences based on the first portion of the request information;
   sending, by the AF component, the user device preferences to a Network Slice Selection Function (NSSF) component of the one or more devices in the core network; and
   determining, by the NSSF component, the first set of one or more network slice policies based on the user device preferences.

10. The method of claim 8, wherein the first portion of the request information is information that identifies the user device.

11. The method of claim 1, wherein providing, by the device in the RAN, the first portion of the request information to the one or more devices in the core network includes:
   providing the first portion of the request information to a User Plane Function (UPF) component of the one or more devices in the core network.

12. The method of claim 11, wherein determining, by the one or more devices in the core network, the first set of one or more network slice policies for managing the communications session based on the first portion of the request information includes:
   determining, by the UPF component, application communication requirements based on the first portion of the request information;
   sending, by the AF component, the application communication requirements to a Network Slice Selection Function (NSSF) component of the one or more devices in the core network; and
   determining, by the NSSF component, the first set of one or more network slice policies based on the application communication requirements.

13. The method of claim 11, wherein the first portion of the request information is information that identifies a communications attribute of the application.

14. The method of claim 1, wherein applying, by the device in the RAN, the first set of network slice policies to the communications session includes:
   allocating radio access resources according to the first set of one or more network slice policies to affect a flow of one or more packets transmitted by the user device during the communications session.

15. The method of claim 1, wherein detecting the change in one or more properties of the communications session after applying the set of network slice policies to the communications session includes:
   detecting a change in one or more of:
      a type of application associated with the communications session;
      a type of service associated with the communications session;
      a source internet protocol (IP) address associated with the communications session;
      a destination IP address associated with the communications session;
      a source port associated with the communications session;
      a destination port associated with the communications session;
      a protocol associated with the communications session;
      a packet characteristic associated with the communications session; or
      a type of API associated with the communications session.

16. The method of claim 1, wherein detecting the change in one or more properties of the communications session after applying the set of network slice policies to the communications session includes:
   detecting, by the device in the RAN, the change in the one or more properties of the communications session; and
   sending, by the device in the RAN, an indication of the change to the one or more devices in the core network.

17. The method of claim 1, wherein detecting the change in one or more properties of the communications session after applying the set of network slice policies to the communications session includes:
- analyzing, by a User Plane Function (UPF) component of the one or more device in the core network, the communication session by determining changes to the one or more properties of the communications session over a period of time; and
- sending, by the UPF component, an analysis signal to a Network Slice Selection Function (NSSF) component.

18. The method of claim 1, wherein determining, by the one or more devices in the core network, a second set of one or more network slice policies for managing the communications session based on the change includes:
- determining, by a Network Slice Selection Function (NSSF) component of the one or more device in the core network, the second set of one or more network slice policies based on the change.

19. A method, comprising:
- receiving, by a device in a radio access network (RAN) and from a user device running an application, a request to initiate a communications session using the RAN and a core network associated with the RAN, the request including request information;
- providing, by the device in the RAN, at least a portion of the request information to one or more devices in a core network associated with the RAN;
- receiving, by the device in the RAN and from the one or more devices in the core network, a first set of one or more network slice policies for managing the communications session, the first set of one or more network slice policies determined based on the at least a portion of the request information;
- applying, by the device in the RAN, the first set of the one or more network slice policies to the communications session;
- detecting a change in one or more properties of the communications session after applying the first set of one or more network slice policies to the communications session;
- notifying the one or more devices in the core network of the change;
- receiving, by the device in the RAN and from the one or more devices in the core network, a second set of one or more network slice policies for managing the communications session, the second set of one or more network slice policies determined based on the change; and
- applying, by the device in the RAN, the second set of one or more network slice policies to the communications session, the second set of one or more network slice policies being applied during the communication session and without communicating with the user device.

20. A method, comprising:
- receiving, by one or more devices in a core network and from a device in a radio access network (RAN) associated with the core network, at least a portion of request information provided by a user device running an application and initiating a communications session using the RAN and the core network;
- determining, by the one or more devices in the core network, a first set of one or more network slice policies for managing the communications session based on the at least a portion of the request information;
- sending, by the one or more devices in the core network, the first set of one or more network slice policies to the device in the RAN, to allow the device in the RAN to apply the first set of the one or more network slice policies to the communications session;
- detecting a change in one or more properties of the communications session after sending the first set of one or more network slice policies to the device in the RAN;
- determining, by the one or more devices in the core network, a second set of one or more network slice policies for managing the communications session based on the change;
- sending, by one of the one or more devices in the core network, the second set of one or more network slice policies to the device in the RAN to allow the device in the RAN to apply the second set of one or more network slice policies to the communications session during the communication session and without communicating with the user device.

* * * * *